Jan. 12, 1971   MASAAKI NOGUCHI ET AL   3,553,979
UNIVERSAL JOINT OF UNIFORM SPEED
Filed Dec. 6, 1968                                       5 Sheets-Sheet 1

INVENTORS
MASAAKI NOGUCHI
SHIGERU SAKAKIBARA &
BY MASAHARU SUMIYOSHI

Harry G. Shapiro
ATTORNEY

INVENTORS
MASAAKI NOGUCHI
SHIGERU SAKAKIBARA &
BY MASAMARU SUMIYOSHI

*Harry G. Shapiro*

ATTORNEY

United States Patent Office 3,553,979
Patented Jan. 12, 1971

3,553,979
UNIVERSAL JOINT OF UNIFORM SPEED
Masaaki Noguchi, Nagoya-shi, Shigeru Sakakibara, Aichi-ken, and Masaharu Sumiyoshi, Toyota-shi, Japan, assignors to Toyota Jidosha Kogyo Kabushiki Kaisha, Toyota-shi, Japan, and jointly with Aishin Seiki Kabushika Kaisha, Kariya-shi, Japan, both corporations of Japan
Filed Dec. 6, 1968, Ser. No. 781,894
Claims priority, application Japan, Dec. 31, 1967, 43/277
Int. Cl. F16d 3/30
U.S. Cl. 64—21
3 Claims

ABSTRACT OF THE DISCLOSURE

The present invention provides a universal joint of uniform speed for transmitting a torque from an input shaft to an output shaft by using balls comprising meridian form ring grooves on a spherical inner surface of a bowl shaped outer member of an input shaft and a spherical outer surface of a spherical inner member, respectively, said grooves being coaxial; a row of large diameter balls fitting with said respective ring grooves, through which the torque is transmitted; a retainer provided between said inner and outer members for determining the positions of said balls; small diameter guide balls are provided intermediate said large diameter balls for determining bisecting plane of the pivoting angle.

---

The present invention relates to a universal joint of uniform speed for transmitting a torque from an input shaft to an output shaft.

There has been proposed heretofore a universal joint of uniform speed in which a plural number, for instance six, of balls for transmitting a torque are provided at a joint region of a driving shaft and a driven shaft for transmitting the rotation of the former shaft to the latter shaft. In this conventional universal joint, one end of the driving shaft and the corresponding end of the driven shaft are spherically fitted through an annular retainer sandwiched therebetween, said balls being held by arc grooves provided at the fitted surfaces of the two shafts along with the meridian inclusive of the central line of the shaft, said grooves being formed by making the points equally and symmetrically off-center from the pivoting center of the universal joint as the centers, respectively. The torque is transmitted through the balls from the driving shaft to the driven shaft with a uniform rotational speed by means of not only said internal retainer but also an arrangement such that the balls are located on the planes bisecting the pivoting angle formed by two shafts. The structure of this conventional system is very simple and has a relatively large pivoting range of two shafts, and the rotational movement of the balls is effectively utilized in the pivoting motion between two shafts so that the friction is little, the lubrication is good and relatively high torque with high rotational speed is expected.

The object of the present invention is to further improve the conventional system in a manner to transmit a larger torque such as from 20 to 30 percent greater torque than the conventional system, although the size of the joint structure is the same.

In accordance with the invention, several first balls for transmitting torque and at least three second balls for determining said first balls on the bisection planes of the pivoting angle of the knuckle are alternately and appropriately provided in such a manner that said first and second groups of balls are engaged in the corresponding grooves under the best condition, for example, the consideration is made on the direction of the transmission of rotation and the size of the effective actuating surface thereof between the grooves and torque transmission balls held by the grooves for obtaining the large torque transmission under the uniform speed. In accordance with this invention, greater torque capacity in comparison to the conventional system is obtained although the equivalent size joint is used, and moreover, even when a larger pivoting angle is required, the torque capacity is not deteriorated.

This invention provides a universal joint of uniform speed which comprises a spherical shell formed on either of an input shaft and an output shaft; a spherical body formed on the other shaft; a retainer sandwiched between said shell and body for holding first balls for transmitting a torque and second balls for determining bisecting planes of a pivoting angle of said two shafts; the shell, the body and the retainer being spherically engaged to each other as the pivoting center as their center; first coaxial arc grooves provided at the coresponding surfaces of said shell and body, respectively, as said pivoting center as their center and formed along with a meridian inclusive of the center line of said shaft; each cross section of said groove taken along a plane perpendicular to said meridian having a sector the radius of which is substantially equal to the diameter of said torque transmission balls which are held between two grooves; second arc grooves provided at the corresponding surfaces of said shell and body, respectively, by making the points equally and symmetrically off-center from said pivoting center of the universal joint as the centers, respectively, and formed along with meridian inclusive of the center line of the respective shafts; the cross section of said second groove in the spherical body taken along a plane perpendicular to said meridian passes through the center of the groove having a sector the radius of which is substantially equal to the diameter of second ball while the cross section of said second groove in the spherical shell taken along a plane perpendicular to the meridian passing the center of the groove having a sector of which radius is larger by at least five percent than the diameter of the second balls, which are maintained in radial direction to the pivoting center by the surfaces of said second grooves; and the retainer having openings for maintaining said second balls which are interconnected with the openings for maintaining the first balls.

The present invention will be more apparent from the following description referring to illustrative embodiments shown in the drawing, in which.

Figure 1:
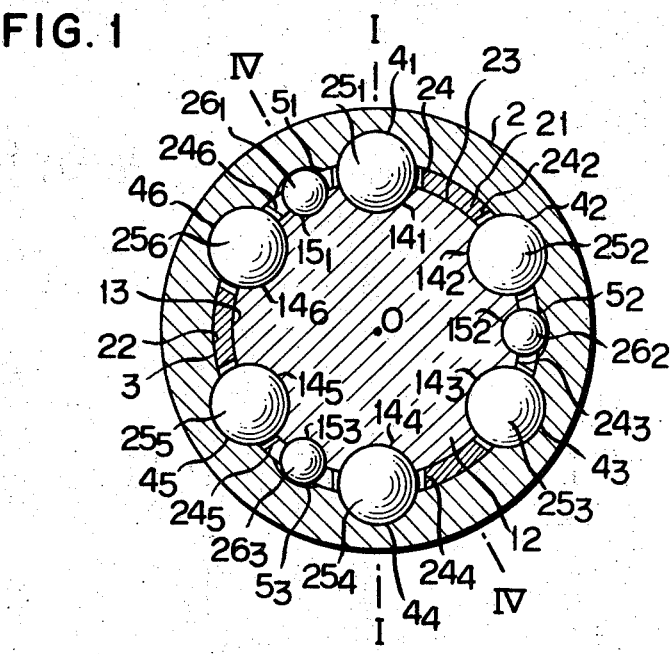
FIG. 1 is a cross sectional front view of a first embodiment of the present invention.

Firstly, the detailed explanations are given below in accordance with FIG. 1 through FIG. 6.

In the specification and in the attached drawings, either the drive shaft or input shaft or the driven shaft or output shaft can be a driven shaft, but for the sake of simplicity, they are uniformly described throughout the whole specification.

A shell 2 and a spherical body 12 are provided on the ends of an output shaft 11 which is a driven shaft and an input shaft 1 which is a drive shaft, and said shell and body are coaxially engaged, as the pivoting center 0 as the center, with the ring form retainer 21 therebetween.

The internal spherical surface 3 inside the shell 2, and the external spherical surface 22 of the outside of the retainer 21 each on a radius of curvature formed respectively with the center 0, and the internal spherical surface portion 23 inside the retainer 21 and the external spherical surface portion 23 inside the retainer 21 and the external spherical surface portion 13 on the outer surface of the body 12 are engaged on the spherical surface formed by the center 0.

Next, on the internal spherical surface portion 3 of the shell 2, six arc form grooves $4_1$, $4_2$ . . . $4_6$ formed along the meridian are provided with equal intervals by making the pivoting center 0 as the center inclusive of the central line P0 of shaft 1. The arc form grooves $14_1$, $14_2$ . . . $14_6$ are formed along the meridian of the equal diameter to said grooves $4_1$ through $4_6$ and these six arc form grooves are making the pivoting center 0 as the center inclusive of the central line P'0 of the shaft and are formed on the external spherical surface portion 13 of the body 12 at the corresponding position to the arc form grooves $4_1$, $4_2$ . . . $4_6$.

Figure 7:
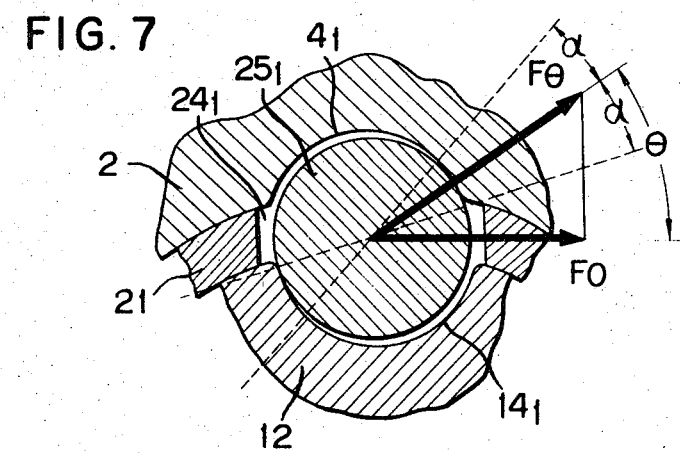
FIG. 7 is an enlarged cross sectional view of the balls for transmitting torque and the grooves thereof as is shown in FIG. 1.

In regard to the cross sectional view of said grooves in the rectangular direction across the meridian, the grooves are in arc form of such a depth that about 160° arc portion thereof can be put in by making the same almost equal to the external diameters of the balls for transmitting torque $25_1$, $25_2$ . . . $25_6$, as shown in FIG. 1 and FIG. 7 given hereinafter.

Next, long holes $24_1$ through $24_6$ are provided on a ring retainer 21 elongated in its ring direction at the places of the same phase as the above mentioned six grooves. The width of the holes in the meridian direction, i.e., in the direction of shorter diameter of said long holes, is almost equal to the diameter of the balls for transmitting torque, and these balls are inserted therein, and are pinched by said arc form grooves $4_1$, $4_2$ . . . $4_6$ and arc form grooves $14_1$, $14_2$ . . . $14_6$ to the effect that the balls cannot be moved freely.

Next, on the internal spherical surface portion of the outer shell 2, off-center grooves $5_1$, $5_2$ and $5_3$ are formed between the grooves $4_6$ and $4_1$, grooves $4_2$ and $4_3$, grooves $4_4$ and $4_5$, respectively, along the three meridians inclusive of the central line P0 of the shaft 1 with the point $E_1$ off-center from the central point 0 as the center. At the positions corresponding to these off-center grooves $5_1$ through $5_3$ and on the external spherical surface 13 of the spherical body 12, another set of off-center grooves $15_1$, $15_2$ and $15_3$ are formed between said grooves $14_6$ and $14_1$, grooves $14_2$ and $14_3$, and grooves $14_4$ and $14_5$, respectively, along three meridians having the same diameter as those of above mentioned meridians inclusive of the central line P'0 of the shaft 11 with the point $E_2$ symmetrically off-center from the central point 0 by the same distances as that of the point $E_1$. And between the corresponding grooves $5_1$ and $15_1$, $5_2$ and $15_2$, and $5_3$ and $15_3$, balls $26_1$, $26_2$ and $26_3$ are maintained, respectively, for determining the bisecting plane of the pivoting angle. These balls $26_1$ through $26_3$ are, as the same as balls for transmitting torque, maintained within long holes $35_1$, $35_2$ and $35_3$ having substantially equal width with the ball diameter in the meridianal direction and elongated in the direction perpendicular to the meridianal direction. These long holes $35_1$ through $35_3$ are straight line grooves as seen from the development thereof of FIG. 6, and the hole $35_1$ interconnects holes $24_6$ and $24_1$ for torque transmission balls, the hole $35_2$ interconnects holes $24_2$ and $24_3$ and the hole $35_3$ interconnects holes $24_4$ and $24_5$, however, this is only for the sake of working, and all of these nine holes can be made independent to each other, which is considered rather normal case than the present embodiment.

Figure 2:
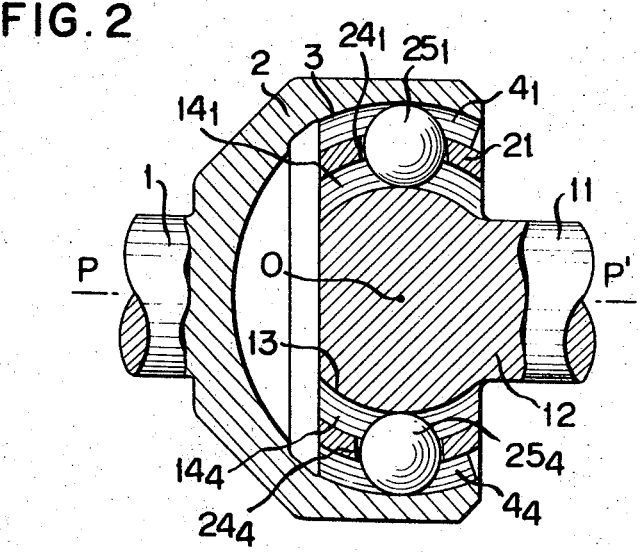
FIG. 2 is a cross sectional view across I—I line of FIG. 1.
Figure 3:
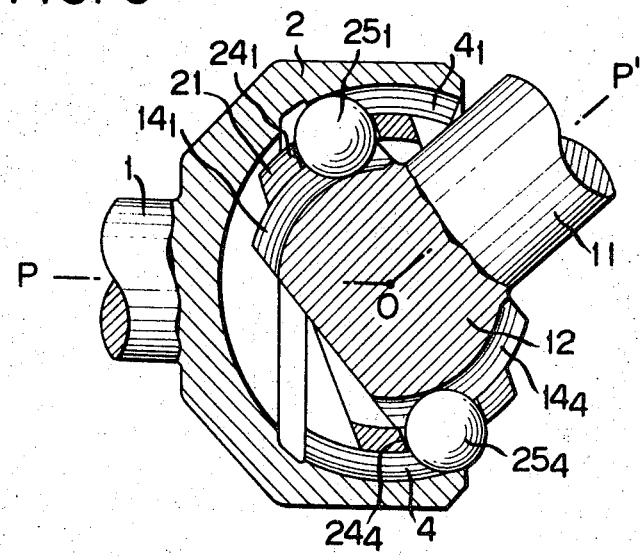
FIG. 3 is a cross sectional view as shown in FIG. 2 but illustrating the output shaft at a pivoting angle.
Figure 4:
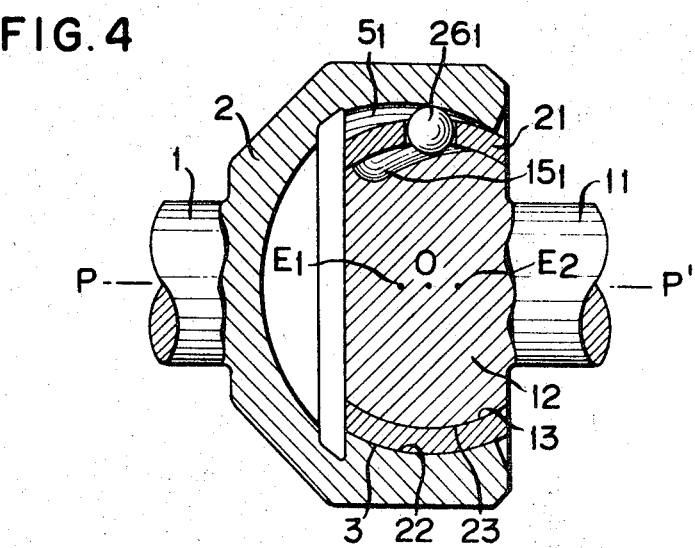
FIG. 4 is a cross sectional view across IV—IV line of FIG. 1.
Figure 5:
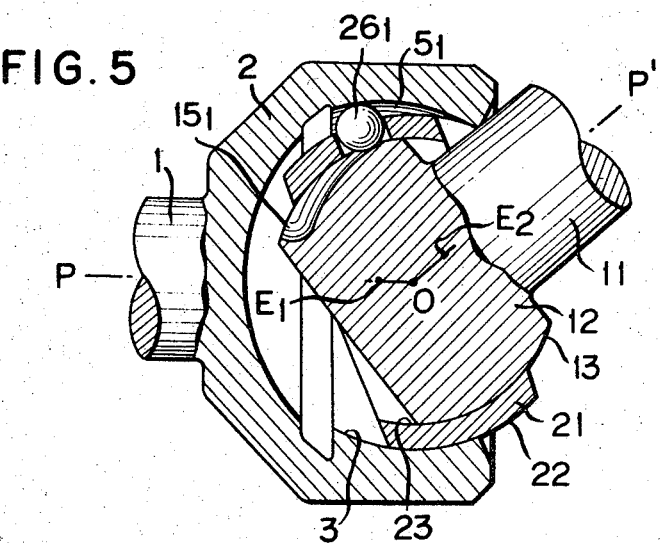
FIG. 5 is a cross sectional view as in FIG. 4, but shows the case in which the output shaft takes a pivoting angle.
Figure 6:
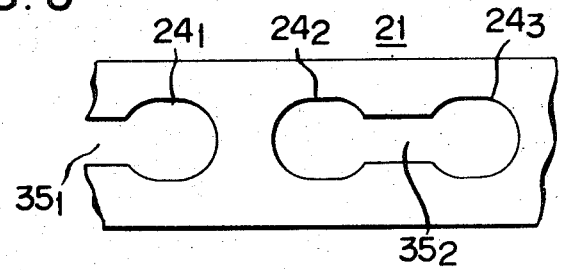
FIG. 6 is a development of a retainer used in the embodiment of FIGS. 1–5.

It is to be noted that in the above explanations, as seen from FIG. 2, the cross section taken along a line perpendicular to the meridian of each arc grooves $4_1$ through $4_6$ and $14_1$ through $14_6$ and off-center grooves $5_1$ through $5_3$ and $15_1$ through $15_3$ is observed as if it were of one sector of substantially equal size to the diameter of ball, however, in correctly explaining, although the detailed explanation is omitted, it is a combination of more than two arcs or a combination of more than two arcs andt straight line portions or a combination of these portions with a relief portion. And the shape is determined by taking contact direction of ball, i.e. the torque transmission direction and its position and the size of the portion receiving compression, into consideration.

The operation of the first embodiment is as follows:

Six balls for torque transmission, $25_1$, $25_2$ . . . $25_6$ are the mediums for transmitting the rotation and torque of the input shaft 1 to the output shaft 11. Namely, the torque of the input shaft 1 is transmitted to the arc form grooves $14_1$, $14_2$ . . . $14_6$ of the body 12 of the output shaft 11 by making the balls $25_1$, $25_2$ . . . $25_6$ as the medium from the arc form grooves $4_1$, $4_2$ . . . $4_6$ within the shell, and can be obtained on the output shaft 11, but in order to have this joint as the universal joint of uniform speed, although the detailed explanation is omitted but six balls for transmitting torque must be on the bisecting surfaces of the pivoting angle formed by the input shaft 1 and the output shaft 11, and therefore the retainer and the balls for transmitting torque are present on the bisecting surfaces by being guided by the three balls $26_1$, $26_2$ and $26_3$ for determining the bisecting surfaces positioned on the above mentioned two bisecting surfaces pinched by three decentered grooves $5_1$, $5_2$ and $5_3$, and the three decentered grooves $15_1$, $15_2$ and $15_3$.

It is added here that, the six balls for transmitting torque are rotated by one half of the displacement angle in accordance with the relative displacement conducted by the two grooves pinching said six balls when the pivoting motion is made during the rotation, and they come to the bisecting surfaces directly, but it is the case when there is no play or slip between the balls and the grooves, and practically, there is a possibility that the excess or shortage of the movement of balls is apt to be brought about, and in order to correct the same, the balls for determining the bisecting surfaces are utilized. However, the force required for the correction is such that it can overcome the frictional force, i.e., it is a little force corresponding to the frictional coefficient, and therefore the balls for determining the bisecting surface are only three and the diameter thereof is remarkably smaller than the diameter of the balls for transmitting torque.

Next, the following are the reasons why the universal joint of this invention can transmit remarkably larger torque when compared with the joint of the conventional system according to which balls are used, are given below.

As is shown in the first embodiment, torque is transmitted in an angled direction avoiding the retainer in the neighbourhood of the center portion of the balls in either case that the torque is transmitted to the internal groove through the balls from the outer groove, or the torque is transmitted to the outer groove from the internal groove through the balls, and as is shown in FIG. 7, the torque $T_0$ at the center of one ball becomes as follows.

$$R_0 = F_0 R$$

In the above given formula R is the distance from the center 0 to the balls and $R_0$ is the force of rotation in the direction of the rotation.

In transmitting torque through balls, the force is tangential to the groove in an angled direction, and therefore when the force $F_\theta$ and the direction thereof is set to be $\theta$, the following relation can be obtained between the same and the torque $T_0$.

$$T_0 = F_0 R = F_\theta R \cos \theta$$

Therefore, $F_\theta = F_0 / \cos \theta$

The following table can be obtained from the above given formula:

TABLE

| $\theta$ | $F_\theta$ |
|---|---|
| 0 | $F_0$ |
| 20 | $1.15 F_0$ |
| 30 | $1.19 F_0$ |
| 45 | $1.41 F_0$ |

As is apparent from the above given formula, when the working direction $\theta$ of the transmitted torque becomes greater, the working force $F_\theta$ in the same direction becomes greater. This means that the contacting pressure between the balls and the grooves becomes greater, and it is preferable to eliminate the same as small as possible, but in order to do this, $\theta$ should be made smaller.

However, what is important here is that the range from $\theta \pm \alpha$ of the pressure receiving portion around the central direction $\theta$ of the working force, is required, and more in particular, when it is not sufficient on the side of $\theta - \alpha$, break-down is generated from the end of the groove, and it is impossible to transmit the larger torque.

In accordance with this invention, the range of $\theta \pm \alpha$ can be obtained by taking into consideration the above given facts.

For example, $$30 \pm 10° \quad 35 \pm 15° \quad 40 \pm 20°$$

The reason why the minimum limit of the above mentioned figures is 20° is that the thickness of the retainer 21 is made to be the standard, and the figure should be as small as possible.

For the sake of reference, the explanation is given about conventional means for transmitting torque through balls with decentered arc form groove. The working direction $\theta$ of the torque can be determined by taking into consideration, as the standard, the position where the pivoting angle is at the maximum, i.e., in case when the arc form grooves becomes shallowest, and the thickness of the retainer. Therefore, for example, when the maximum pivoting angle is 40°, it cannot help but to become within the below given range.

$$45 \pm 10°$$

The above given value becomes disadvantageous value in proportion to the pivoting angle as explained above. In other words, when the pivoting angle becomes greater, a torque transmission efficiency or torque capacity becomes less.

On the other hand, in accordance with this invention, even if pivoting angle should be increased, there is no likelihood that the depth of the groove should not be made shallower, but it remains unchanged, and therefore the torque capacity is not deteriorated so much. In accordance with this invention, there is such an advantage that the form of the groove can be sufficiently satisfied with the above explained value of $\theta \pm \alpha$.

The following is an explanation about the balls $26_1$, $26_2$, and $26_3$ for determining the bisecting surfaces and the grooves thereof. The force required when the position of the balls for transmitting torque by guiding the same correctly to the bisecting surfaces through the retainer is such as the force obtained by multiplying the working force working between the balls for transmitting torque and the grooves thereof by frictional coefficient, and therefore the balls for determining the bisecting surfaces are three, i.e., the half number of the former, and the outer diameter thereof is made remarkably smaller than the former, as described before, but in regard to the direction of the contacting surface between the balls and the grooves, as is shown in the enlarged diagram of FIG. 8, it is mainly done in the radial direction, and it is the most rational and advantageous direction in view of the pressure receiving capacity and in view of the precision of the determination the bisecting surfaces.

Figure 8:
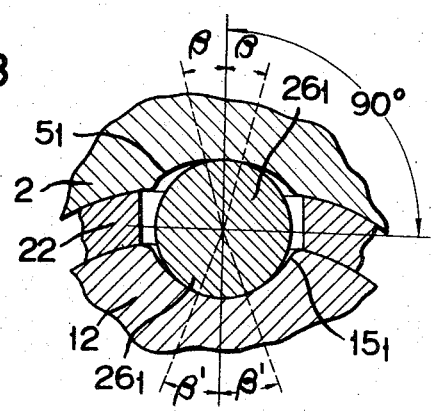
FIG. 8 is an enlarged cross sectional view of the second balls for determining the bisecting surfaces of the pivoting angle and the grooves therefor.

When compared with the working direction of the rotation of the torque transmitting balls, the former is advantageous as $\theta$ becomes zero, but the latter is preferable as it goes towards 90°. Thus, the former grooves and the latter grooves look as if they are one arc whose diameter is almost the same as the balls, but as a matter of fact, they are substantially and rationally differentiated by taking into consideration the size of the pressure receiving surface and the contacting direction in order to obtain the longest durability. For example, the arc form grooves for the balls for transmitting torque has different contacting direction when it is rotated in the clockwise direction or in the counter clockwise direction, and backlash is provided, although it is minute, so that it does not interfere at the back of the balls. Therefore, the cross sectional form thereof, as is shown in FIG. 7, is that it is made into the groove whose diameter is more or less larger than that of the ball, or arc form wall the left and right thereof being made with respectively different centers, and at the bottom of in the radial direction, it is not taken part as the pressure receiving portion but it is made into a relief portion so as to avoid the interference. In regard to the cross sectional view of off-center grooves for the balls for determining bisecting plane, as is shown in FIG. 8, the groove $15_1$ is the wall of an arc whose diameter is almost equal to the diameter of the ball $26_1$, but the groove $5_1$ inside the shell is the wall whose diameter is considerably larger, i.e., about 15% larger than the diameter of the ball $26_1$. The reason for this is that slight backlash is provided on the groove of the balls for transmitting torque, and therefore it is made into slightly loose groove in the direction of the rotation so as to perform the function of the bisecting plane without preventing the backlash so as to follow the same.

The reason why it is adopted on the groove on the side of the shell in order to perform the above mentioned object, is that the pressure resistance force of the groove on the shell side is greater than that of the groove on the side of the body, because of the curve of the groove observed from the direction of meridian, and therefore the groove on the side of the shell is made to be loose groove by taking into consideration the balance. Thus, the strength of the two grooves are almost equal, and the functions thereof can be performed.

The above are the explanations about the structure, effects and features of the first embodiment of this invention, and the explanations about the second and the third embodiment of this invention are briefly given in accordance with FIG. 9 through FIG. 12.

Figure 9:
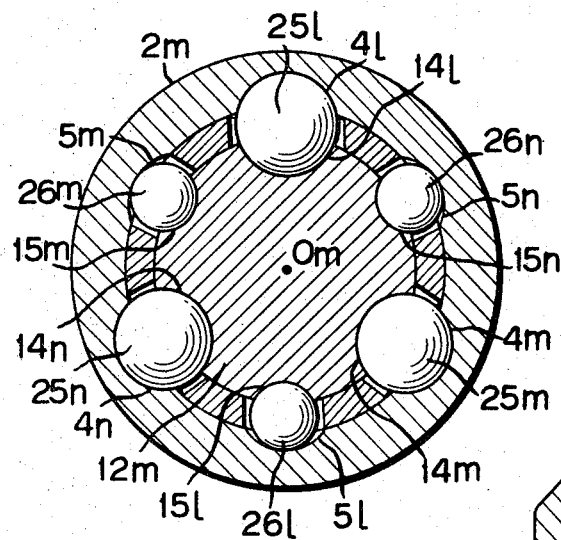
FIG. 9 is a cross sectional front view of a second embodiment of this invention.
Figure 10:
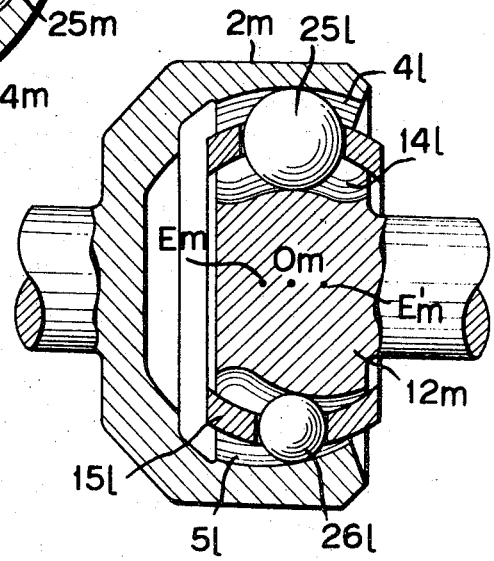
FIG. 10 is a horizontal cross sectional view of the embodiment of FIG. 9.
Figure 11:
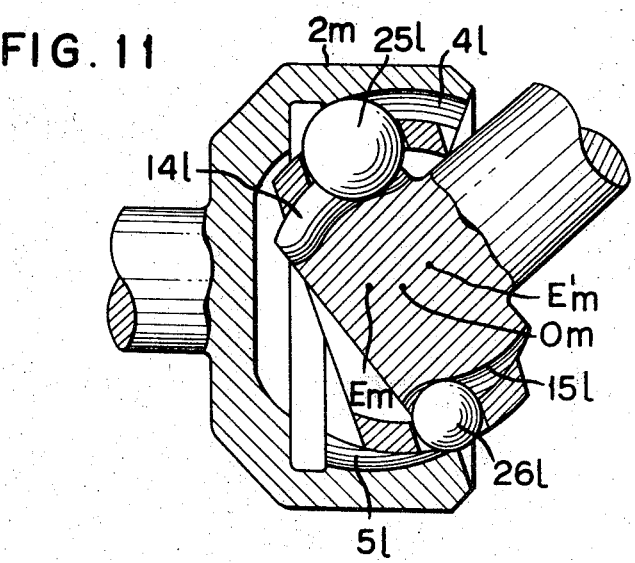
FIG. 11 is a horizontal cross sectional view as shown in FIG. 9, but illustrating the output shaft at a pivoting angle.
Figure 12:
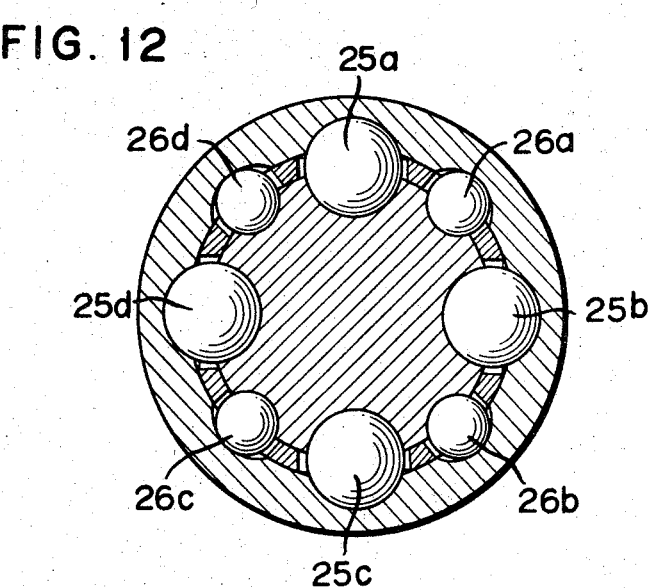
FIG. 12 is a cross sectional front view of a third embodiment.

The second embodiment shown in FIG. 9, FIG. 10 and FIG. 11 have three balls, i.e., $25_1$, $25_m$, and $25_n$ for transmitting torque, and have three balls, i.e., $26_1$, $26_m$, and $26_n$ for determining the bisecting planes. Thus, in this case too, as in the preceding embodiment, the arc form grooves $4_1$, $4_m$ and $4_n$ on the side of the shell $2_m$ for the balls for transmitting torque and the arc form groove $14_1$, $14_m$, and $14_n$ on the side of the body $12_m$ are formed along the meridian with the same center $0_m$ as the center of the arc form groove $14_1$, $14_m$ and $14_n$ as the center, and in regard to the grooves for the balls for determining the bisecting planes, the grooves $5_l$, $5_m$, and $5_n$ on the side of the shell $2_m$ are the off-center grooves formed along the meridian with the off-center point $E_m$ as the center, and the grooves $15_l$, $15_m$ and $15_n$ on the side of the body $12_m$ are formed along the meridian with the off-center point $E'_m$ as the center. In regard to the functions, they are the same as the first embodiment, and the features of the second embodiment reside in that if the outer diameter of the second embodiment is almost the same as that of the first embodiment, the balls for determining the bisecting plane of larger size and the balls for transmitting torque of larger size can be used, and in particular, by making torque transmitting balls larger, with only three balls almost same torque capacity as in the case when 6 balls are used can be obtained and although in view of efficiency, there is no difference, but the cost of production can be greatly reduced.

Next, in the third embodiment, the four balls $25_a$, $25_b$, $25_c$ and $25_d$ for transmitting torque and the four balls $26_a$, $26_b$, $26_c$ and $26_d$ for determining the bisecting plane are used, and in the third embodiment the balls $26_a$ through $26_d$ are symmetrically provided, and since four balls are employed, the ability of determining bisecting plane can be secured and increased.

What is claimed is:

1. Universal joint of uniform speed comprising a shell having a spherical internal surface formed on one of input and output shafts; a body formed on the other shaft, said body having a spherical external surface; a retainer sandwiched between said shell and body for holding a plurality of spaced first balls for transmitting torque and a plurality of second balls for determining bisecting planes at a pivoting angle of said shafts; the spherical internal surface of the shell, the spherical external surface of the body and the retainer being related to each other with the center of the body as their center of curvature; first coaxial arc grooves provided at the opposite surfaces of said shell and body having said body center as their center of curvature and formed along a meridian inclusive of the center line of the body shaft; each cross section of said grooves taken along a plane perpendicular to said meridian having a sector the radius of which is substantially equal to the diameter of said torque transmission balls which respectively are held between each pair of said grooves; second arc grooves provided at the opposite surfaces of said shell and body respectively on arcs equally and symmetrically off-center from said body center and formed along a meridian inclusive of the center line of the respective shafts; said second balls being maintained between the surfaces of said second arc grooves in the axial direction relative to said body center.

2. Universal point of uniform speed according to claim 1, in which the cross section of each of said second grooves in the body taken along a plane perpendicular to said meridian plane passing through the center of the groove has a sector the radius of which is substantially equal to the diameter of a second ball, the cross section of the opposite groove in the shell taken along a plane perpendicular to the meridian passing through the center of the groove having a sector the radius of which is larger by at least five precent than the diameter of a second ball.

3. Universal joint of uniform speed according to claim 1, in which said retainer has openings for maintaining said second balls and interconnecting openings for maintaining the first balls.

References Cited

UNITED STATES PATENTS

| | | | |
|---|---|---|---|
| 1,985,278 | 12/1934 | Bradley | 64—21 |
| 2,325,460 | 7/1943 | Amberg | 64—21 |
| 2,510,362 | 6/1950 | Anderson | 64—8 |
| 3,237,429 | 3/1966 | Henry-Biabaud | 64—8 |
| 3,298,201 | 1/1967 | Cadiou | 64—21 |
| 3,310,960 | 3/1967 | Cull | 64—21 |

JAMES A. WONG, Primary Examiner